United States Patent [19]
Wilson

[11] Patent Number: 5,414,232
[45] Date of Patent: May 9, 1995

[54] NOISE ATTENUATION PANEL

[75] Inventor: Robert S. Wilson, Belfast, Northern Ireland

[73] Assignee: Short Brothers PLC, Belfast, Northern Ireland

[21] Appl. No.: 39,080
[22] PCT Filed: Jan. 21, 1992
[86] PCT No.: PCT/GB92/00119
  § 371 Date: Apr. 13, 1993
  § 102(e) Date: Apr. 13, 1993
[87] PCT Pub. No.: WO92/12855
  PCT Pub. Date: Aug. 6, 1992

[30] Foreign Application Priority Data
  Jan. 22, 1991 [GB] United Kingdom ............... 9101355

[51] Int. Cl.⁶ .................................................. E04B 1/82
[52] U.S. Cl. ..................................... 181/292; 181/294; 181/210
[58] Field of Search ............... 181/210, 211, 213, 214, 181/217, 218, 222, 286, 288, 290, 291, 292, 294; 428/116, 117, 118

[56] References Cited
U.S. PATENT DOCUMENTS 3,868,297 2/1975 Jamison et al. ............... 161/68
4,088,723 5/1978 Norton ........................... 264/45.5
4,235,303 11/1980 Dhoore et al. ............... 181/292 X
4,671,841 6/1987 Stephens ....................... 181/292 X

FOREIGN PATENT DOCUMENTS 0352993 7/1989 European Pat. Off. .
2504520 4/1981 France .
3537962 7/1987 Germany .
 750239 6/1956 United Kingdom .
2101930 1/1983 United Kingdom .

Primary Examiner—Howard B. Blankenship
Assistant Examiner—Khanh Dang

[57] ABSTRACT

A noise attenuation panel 10 for an aero engine environment comprises a first cellular component part 121 which has wall portions which extend from the front face to the rear face and which provide bounding surfaces for an array of cells 15 and a second cellular component part 122 in the form of an open-celled structure having a multiplicity of the intercommunicating cells obtained by aggregation of particulate material or by the displacement of material by a dispersion or like technique. A backing component part 11 is secured to the rear face of the second cellular component part 121, the front face of which is secured to the rear face of the first cellular component part and a facing component part 14 is secured to the front face of the first cellular component part. In an alternative form, the positions of the cellular component parts 121, 122 are interchanged.

17 Claims, 3 Drawing Sheets

NOISE ATTENUATION PANEL

FIELD OF THE INVENTION

The present invention relates to noise attenuation panels and is particularly, although not exclusively, concerned with noise attenuation panels for use in the attenuation of noise in aero engines.

DESCRIPTION OF THE BACKGROUND ART

In patent application publication GB-A- 2223448 there is disclosed a noise attenuation panel having a backing component part, a facing component part and a cellular component part having a multiplicity of open-ended juxtaposed cells, the backing component part extending across the ends of the cells of the cellular component part at the rear thereof and the facing component part extending across the ends of the cells of the cellular component part at the front thereof. In addition, the facing component part comprises or includes an outer facing sheet which is made of a porous permeable thermoplastics material. Preferably, the porous permeable thermoplastics material is produced by powder sintering of a thermoplastics materials.

In one embodiment of the invention described in GB-A-2223448, the cellular component part comprises a single cellular element having wall portions which extend across the element from the front face thereof to the rear face thereof and which provide bounding surfaces for an array of open-ended juxtaposed cells.

In another embodiment of the invention described in GB-A-2223448, the cellular component part is subdivided into a front cellular element and a rear cellular element positioned to the rear of the front cellular element with a septum element extending between the two cellular elements. Each cellular element has wall portions which extend across the element from the front face thereof to the rear face thereof and which provide bounding surfaces for an array of open-ended juxtaposed cells.

While the panel disclosed in GB-A-2223448 has been found to be successful for use in aero engine environments, drawbacks may be found in using a cellular component part formed as a single cellular element or as two cellular elements in which the element or each element is formed as described.

SUMMARY OF THE INVENTION

According to a first aspect of the present invention, there is provided a noise attenuation panel comprising a first cellular component part which has a front face and a rear face and which has wall portions which extend across the first cellular component part from the front face to the rear face and which provide bounding surfaces for an array of cells, a second cellular component part which has a front face and a rear face and which is in the form of an open-celled structure, a backing component part which is secured to or adjoins the rear face of one of the cellular component parts, the front face of which is secured to or adjoins the rear face of the other cellular component part and a facing component part which is secured to or adjoins the front face of the other cellular component part.

By "open-celled structure" is meant a cellular structure having a multiplicity of intercommunicating cells obtained by aggregation of particulate material or by the displacement of material by a dispersion or like technique from a body of material in liquid phase followed by a solidifying step.

In one embodiment of the invention hereinafter to be described, the wall portions of the first cellular component part provide bounding surfaces for a multiplicity of open ended juxtaposed cells which terminate in open ends at the front and rear faces of the first cellular component part.

The wall portions of the first cellular component part may be made from an impermeable material which may be a non-porous impermeable thermoplastics material. Alternatively, the wall portions of the first cellular component part may be made of a porous permeable thermoplastics material.

In an embodiment of the invention hereinafter to be described the second cellular component part is made of a porous permeable thermoplastics material. Preferably, the porous permeable thermoplastics material is produced by powder sintering a thermoplastics material.

The second cellular component part may also take the form of an open-celled plastics foam.

In one of the embodiments of the invention hereinafter to be described the backing component part adjoins the rear face of the second cellular component part, the front face of which adjoins the rear face of the first cellular component part and the facing component part adjoins the front face of the first cellular component part.

In another of the embodiments of the invention hereinafter to be described, the backing component part adjoins the rear face of the first cellular component part, the front face of which adjoins the rear face of the second cellular component part and the facing component part adjoins the front face of the second cellular component part.

Adjoining component parts may be secured together by an adhesive material. Alternatively, two or more adjoining component parts may be made of compatible bonding thermoplastics materials and bonded together without the use of an adhesive material.

In an embodiment of the invention hereinafter to be described the facing component part comprises or includes an outer facing sheet made of a porous permeable thermoplastics material. Preferably, the porous permeable thermoplastics material is produced by powder sintering a thermoplastics material.

The facing component part may further include an inner facing sheet made from an open square weave fabric providing apertures therein constituted by the openings between adjacent warp and weft threads of the fabric.

In an alternative embodiment of the invention the facing component part comprises an outer facing sheet which is made from an open square weave fabric providing apertures constituted by the openings between adjacent warp and weft threads of the fabric.

Where an open square weave fabric is used it may be so woven as to produce a proportion of open aperture area relative to the total surface area of the sheet of 30% or substantially 30%.

In the embodiments of the invention hereinafter to be described, the backing component part is imperforate and made of a non-porous impermeable material.

The thermoplastics material used for the various component parts as hereinbefore specified may be polyether ether ketone. Alternatively, the thermoplastics material is polyether ketone, polyaromatic ketone, polyphenylene sulphide, polyamide-imide, thermoplastic polyimide, polyether-imide, polyurethane or polyethylene.

According to a second aspect of the present invention, there is provided an aero engine having a surface subjected to the passage across it of gaseous flow and a noise attenuation panel according to the first aspect of the invention so positioned that its front face forms the surface or part of the surface subjected to passage of the gaseous flow across it.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the invention will now be described with reference to the accompanying drawings which are given by way of illustration only, and thus are not limitative of the present invention, and in which.

DESCRIPTION OF THE PREFERRED EMBODIMENTS

Figure 1:
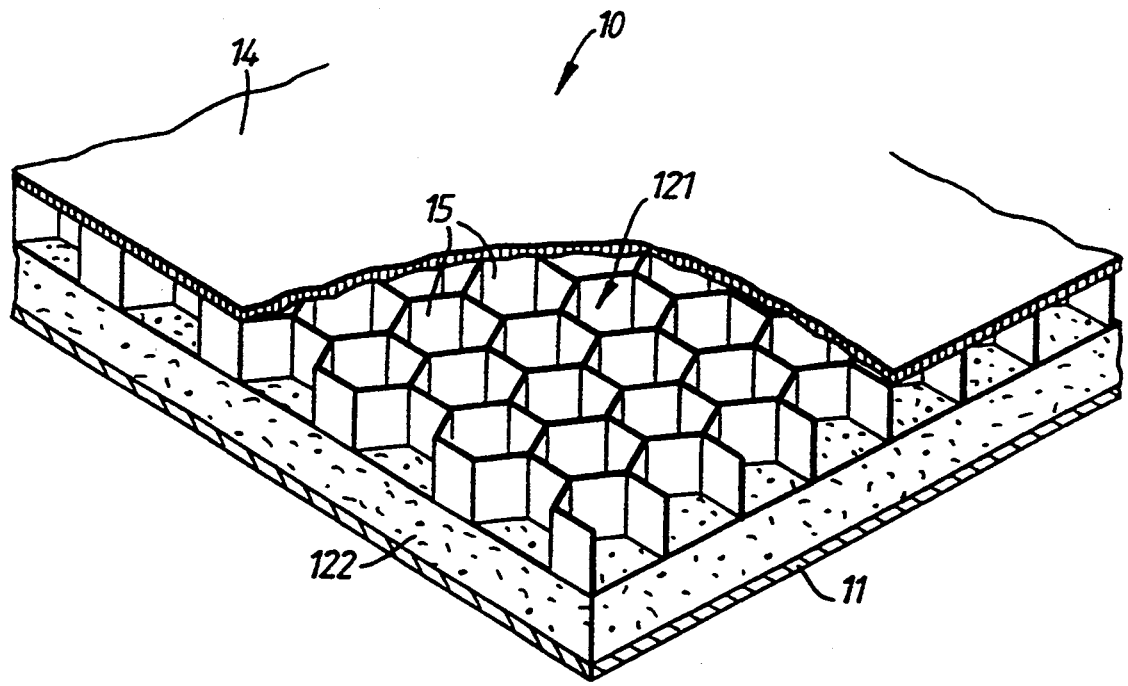
FIG. 1 is a schematic isometric view from above of a noise attenuation panel according to a first embodiment of the invention.
Figure 2:
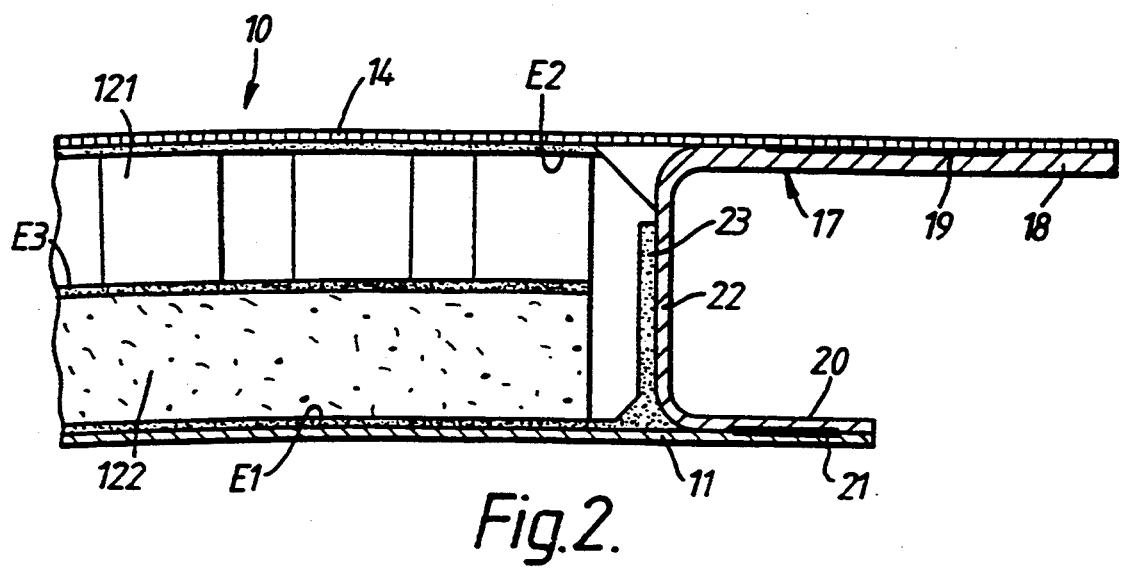
FIG. 2 is a schematic cross section of an end region of the panel shown in FIG. 1, secured to a supporting channel member.

Referring first to FIGS. 1 and 2, the noise attenuation panel 10 comprises a backing sheet 11, cellular elements 121 and 122 and a facing sheet 14. The upper cellular element 121 comprises a multiplicity of open-ended juxtaposed cells 15 of hexagonal cross section which form a honeycomb configuration and the lower cellular element 122 is made from a porous permeable thermoplastics material produced by powder sintering the thermoplastics material or is in the form of an open-celled plastics foam.

The backing sheet 11 is unperforated and made from an impermeable sheet material and, as shown in FIG. 2, is secured by an epoxy resin adhesive E1 to the lower face of the cellular element 122.

The facing sheet 14 is, as shown in FIG. 2, secured to the upper face of the cellular element 121 by means of an epoxy resin adhesive E2.

The lower face of the cellular element 121 is secured to the upper face of the cellular element 122 by an epoxy resin adhesive E3.

The epoxy adhesives E1, E2 and E3 may for example be obtained from Ciba-Geigy Plastics & Additives Company Limited of Cambridge, England. Adhesives and resins need not however be epoxy resin adhesives, but could for example be a phenolic, polyimide or thermoplastics resin.

The facing sheet 14 comprises a sheet of a porous permeable thermoplastics material produced by powder sintering the thermoplastic. Examples of suitable thermoplastics materials include polyether ketone, polyether ether ketone, polyaromatic ketone, polyphenylene sulphide, polyamide-imide, thermoplastic polyimide, polyether imide, polyurethane and polyethylene.

The walls of the cells of the cellular element 121 are made from a non-porous impermeable sheet of any of the following materials:

(i) A thermoplastic such as polyether ether ketone.
(ii) A polyester fabric/phenolic resin.
(iii) A fibreglass/phenolic resin.
(iv) A NOMEX/phenolic resin (NOMEX being a registered trade mark for an aramid fibre paper impregnated with various resins to produce a structural material). By "aramid" is meant an aromatic polyamide polymer.
(v) An aluminium alloy.

The walls of the cellular element 121 may alternatively be made of a porous thermoplastics material and in particular from any of the materials proposed for the facing sheet 14.

The cellular element 122 may be manufactured from any suitable thermoplastics material. Examples of suitable thermoplastics materials include polyether ketone, polyether ether ketone, polyaromatic ketone, polyphenylene sulphide, polyamide-imide and thermoplastic polyimide, polyether-imide, polyurethane and polyethylene.

The backing sheet 11 is imperforate and made of a non-porous impermeable material and may be made of any of the following materials:

(i) A carbon/thermoplastic composite where for example the thermoplastic is polyether ether ketone, the material being automatically tape wound or hand laid.
(ii) A carbon/epoxy resin.
(iii) An aluminium alloy.

The panel 10 is of arcuate form, possibly of double curvature, and is embodied as a structural part of a duct of a nose cowl of a turbofan aero engine, the panel 10 being one of several arcuate panels disposed just upstream of the fan of the engine. It is, of course, of vital importance that the panel does not deteriorate in use and, in particular, that no part of it becomes detached from its supporting structure. The structure will usually include supporting channel members of which only one member 17 is shown in FIG. 2. The panel 10 is secured to the member 17 by bonding the facing sheet 14 to an outer face of a flange 18 of the channel member 17 using carbon to carbon bond 19 and by bonding the backing sheet 11 to the outer face of a flange 20 of the channel member 17 using a carbon to carbon bond 21. The gap between the panel 10 and the base 22 of the channel member 17 may be sealed or closed by use of a mastic 23.

A panel having a facing sheet 14 made of a porous thermoplastics material as described with reference to FIGS. 1 and 2 has been found to give rise to several advantages over the panels of the prior proposals, including the following:

(1) The cellular structure of the facing sheet when produced by the powder sintering technique can be made to meet permeability requirements over a wide range. The cellular structure may be made permeable to gaseous flow over a wide range of tightly controlled flow and resistance requirements which will be engine dependent and non permeable to a wide range of liquids and solid contaminants.

(2) The cellular structure of the facing sheet when produced by the powder sintering technique provides a highly complex interference flow path as a result of which the noise attenuation properties are greatly enhanced over other forms of perforate and porous material.

(3) The very smooth surface of the facing sheet when produced by the powder sintering technique has substantial acoustic/air flow advantages over other perforate and porous forms. There is a lower flow resistance to high speed air flow, and therefore the overall aero engine power plant efficiency is improved over that obtained using the previously proposed panels;

(4) the sound attenuation is greater and covers a wider frequency range than that of the previously proposed panels;

(5) the thermoplastic component parts do not have the problem of metal galvanic corrosion;

(6) the panel is lighter than the previously proposed panels;

(7) there is an improved "blade-off" energy absorption compared with the previously proposed structures; and (8) there is an improved appearance.

In addition, improved noise attenuation is achieved by using the combination of cellular elements 121 and 122 described with reference to FIGS. 1 and 2 or the combination now to be described with reference to any of FIGS. 3 to 6.

Figure 3:
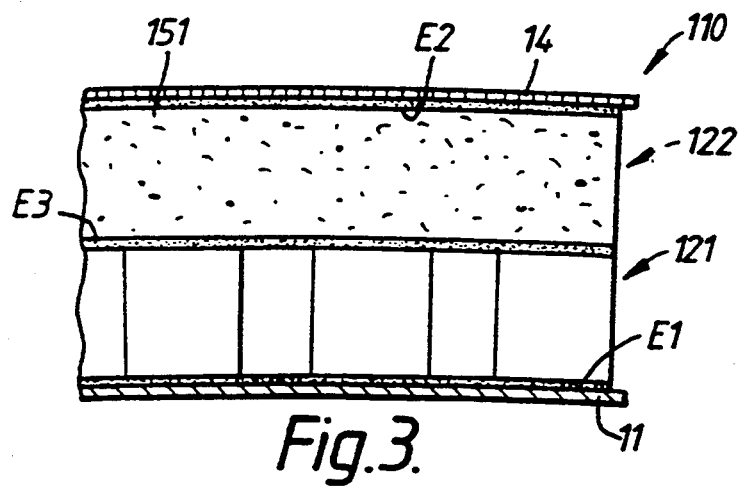
FIGS. 3, 4, 5 and 6 are schematic cross sections of noise attenuation panels according to four further embodiments of the invention.

Referring now to FIG. 3, a second embodiment of the invention is illustrated in which a panel 110 comprises a backing sheet 11, cellular elements 121 and 122 and a facing sheet 14. The backing sheet 11, the two cellular elements 121 and 122 and the facing sheet 14 take the same form as the corresponding elements of the panel 10 illustrated in FIGS. 1 and 2 and are joined together in the same manner by an adhesive E1 which secures the backing sheet 11 to the cellular element 121, an adhesive E2 which secures the facing sheet 14 to the upper face of the cellular element 122 and an adhesive E3 which secures the upper face of the element 121 to the lower face of the element 122.

Preferably, the facing sheet 14 is, as in the panel 10 of FIGS. 1 and 2, made of a porous permeable thermoplastics material produced by powder sintering a thermoplastics material and the cellular element 122 is also preferably made of a thermoplastics material and may be formed in the same manner as the cellular element 122 of FIGS. 1 and 2.

Figure 4:
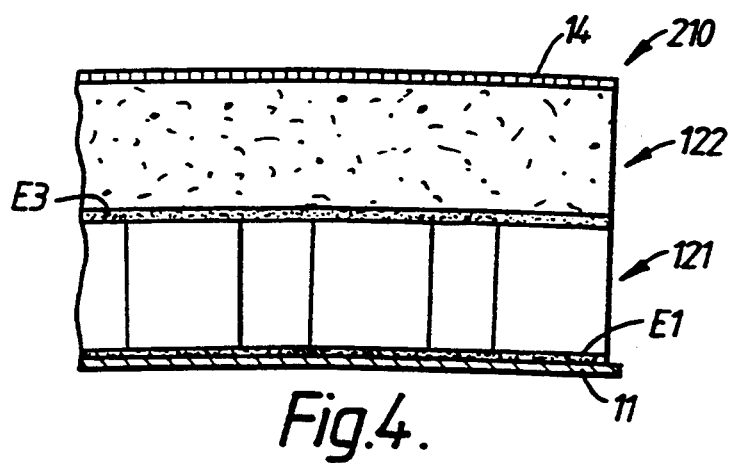

Referring now to FIG. 4 a further embodiment of the invention is illustrated in which a panel 210 takes the same form as the panel 110 in FIG. 3, except insofar as (i) the adhesive E2 is omitted, (ii) the facing sheet 14 and the cellular element 122 are made from compatible bonding thermoplastics materials and (iii) the facing sheet 14 is bonded direct to the upper face of the cellular element 122 during manufacture of the panel.

Figure 5:
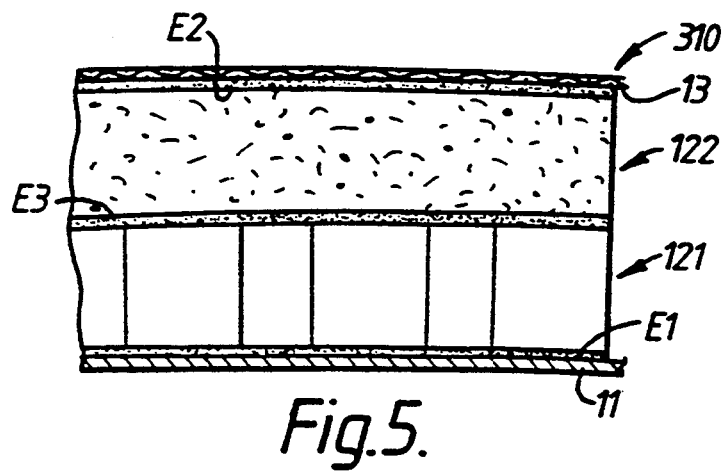

In yet a further embodiment of the invention illustrated in FIG. 5, a panel 310 is provided which takes the same form as the panel 110 in FIG. 3 except insofar as the porous permeable thermoplastics facing sheet 14 is replaced by a facing sheet 13 which is secured to the upper face of the cellular element 122 using an adhesive E2 and which is made from an open square weave fabric formed from a carbon fibre/resin matrix composite material, the weave being such as to provide apertures constituted by the openings between adjacent warp and weft threads of the fabric. The fabric is preferably so woven as to produce a proportion of open aperture area relative to the total surface area of the sheet around 30%. In other respects, the panel 310 takes the same form as the panel 110 in FIG. 3 and is constructed in the same manner.

Figure 6:
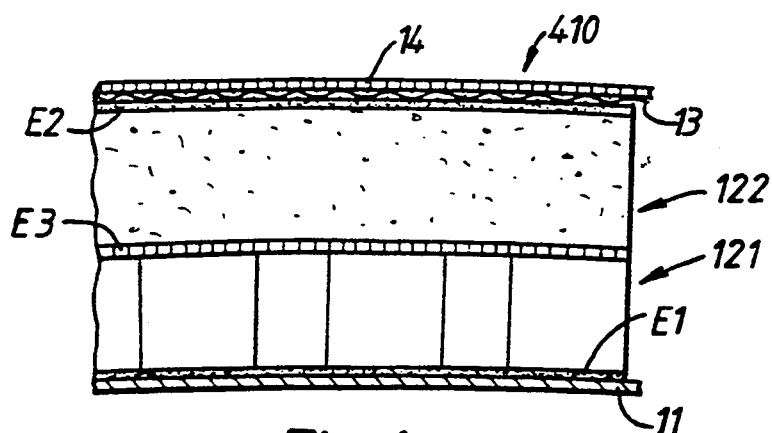

In yet further embodiment of the invention illustrated in FIG. 6, a panel 410 is provided, which takes the same form and is constructed in the same manner as the panel 110 in FIG. 3, except insofar as the facing sheet 14 constitutes an outer facing sheet which extends over an inner facing sheet 13 of the same form as that provided in the panel 310 illustrated in FIG. 5. The facing sheet 14 is made of a porous permeable thermoplastics material produced by a powder sintering process and is bonded during manufacture to the inner facing sheet 13 which is in turn secured by adhesive E2 to the upper cellular element 122.

Figure 7:
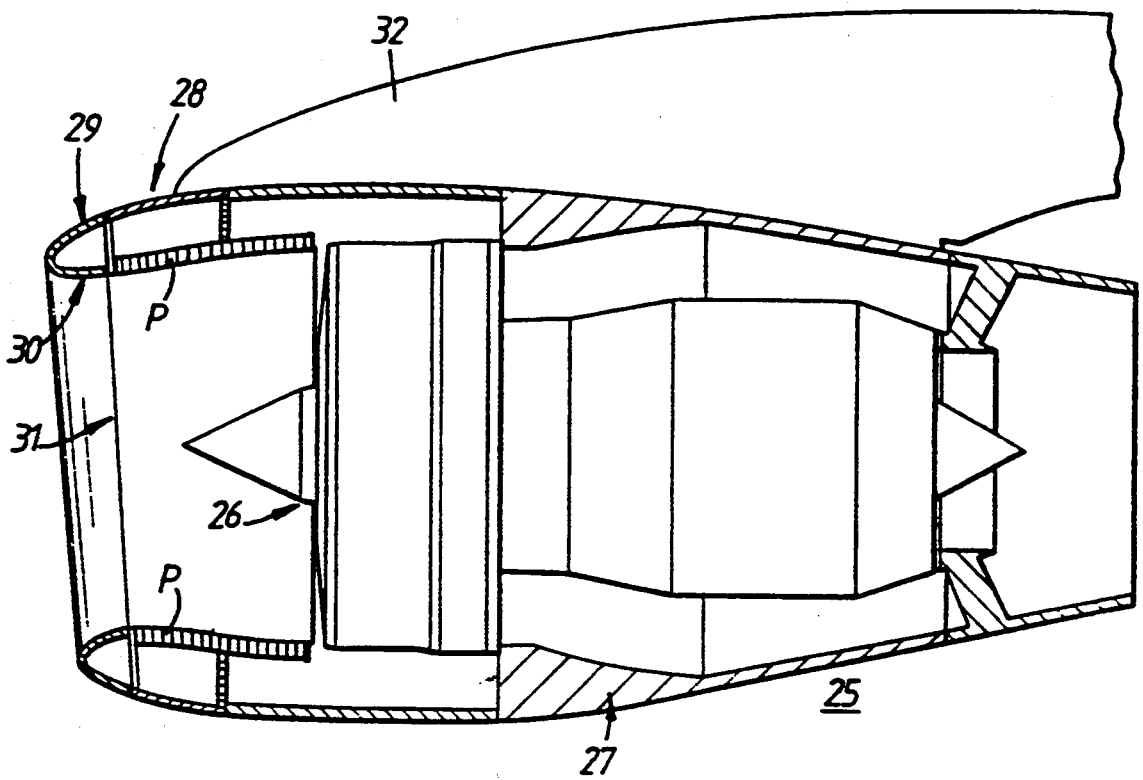
FIG. 7 is a schematic cross-section of an aero engine embodying noise attenuation panels according to the invention.

Referring now to FIG. 7, an aero engine 25 is schematically illustrated and includes a turbofan power unit 26 mounted within a nacelle 27 suspended from a pylon 32. The nacelle 27 includes a nose cowl 28 having an outer wall 29 and an inner wall 30. The inner wall 30 is in part formed by noise attenuation panels P which may take the form of panels 10, 110, 210, 310 or 410 as described and illustrated with reference to FIGS. 1 to 6. The panels P are arranged to form part of the inner wall of the nose cowl 28 and serve to reduce noise created by the high speed flow of air passing through the duct 31 and into the power unit 26, as well as to reduce noise generated by the fan blades of the unit 26.

It is to be emphasised that the panels in FIG. 7 are not employed to reduce air noise by a reduction of the air speed by passage of the air through the panels, but by contrast acoustic attenuation is achieved without affecting the speed of the air which generates the noise, that is to say, the air does not pass through the noise attenuation panels P.

In the aero engine mounting arrangement illustrated in FIG. 7, the power unit is carried by the wing mounted pylon 32. It will however be appreciated that the noise attenuation panels according to the present invention may be equally well be employed for reducing noise in other aero engines installations.

I claim:

1. A noise attenuation panel comprising a first cellular component part which has a front face and a rear face and which has wall portions which extend across the first cellular component part from the front face to the rear face and which provide bounding surfaces for an array of cells, a second cellular component part which has a front face and a rear face and which is a continuous body of material interspersed throughout with intercommunicating cells, a backing component part which is secured to or adjoins the rear face of one of the cellular component parts, the front face of which is secured to or adjoins the rear face of the other cellular component part and a facing component part which is secured to or adjoins the front face of the other cellular component part, wherein the second cellular component part is made of a porous permeable powder sintered thermoplastics material.

2. The panel according to claim 1, wherein the facing component part comprises an outer facing sheet made of a porous permeable thermoplastics material.

3. The panel according to claim 2, wherein the outer facing sheet is made of a porous permeable powder sintered thermoplastics material.

4. The panel according to claim 1, wherein the facing component part comprises an outer facing sheet which is perforated and made of an impermeable material.

5. The panel according to claim 4, wherein the outer facing sheet has a proportion of open perforate area relative to a total surface area of substantially 30%.

6. The panel according to claim 1, wherein the wall portions of the first cellular component part provide bounding surfaces for a multiplicity of open ended juxtaposed cells which terminate in open ends at the front and rear faces of the first cellular component part.

7. The panel according to claim 1, wherein the wall portions of the first cellular component part are made from an impermeable material.

8. The panel according to claim 7, wherein the wall portions of the first cellular component part are made from a non-porous impermeable thermoplastics material.

9. The panel according to claim 1, wherein the wall portions of the first cellular component part are made of a porous permeable thermoplastics material.

10. The panel according to claim 1, wherein the backing component part adjoins the rear face of the second cellular component part, the front face of which adjoins the rear face of the first cellular component part and the facing component part adjoins the front face of the first cellular component part.

11. The panel according to claim 1, wherein the backing component part adjoins the rear face of the first cellular component part, the front face of which adjoins the rear face of the second cellular component part and the facing component part adjoins the front face of the second cellular component part.

12. The panel according to claim 1, wherein at least two of the adjoining component parts are made of compatible bonding thermoplastics materials and bonded together directly without the use of an adhesive material.

13. The panel according to claim 1, wherein the backing component part is imperforate and made of a non-porous impermeable material.

14. An aero engine having a surface subjected to a passage across it of gaseous flow and a noise attenuation panel according to claim 1 so positioned that its front face forms the surface or part of the surface subjected to the passage of gaseous flow.

15. A noise attenuation panel comprising a first cellular component part which has a front face and a rear face and which has wall portions which extend across the first cellular component part from the front face to the rear face and which provide bounding surfaces for an array of cells, a second cellular component part which has a front face and a rear face and which is a continuous body of material interspersed throughout with intercommunicating cells, a backing component part which is secured to or adjoins the rear face of one of the cellular component parts, the front face of which is secured to or adjoins the rear face of the other cellular component part and a facing component part which is secured to or adjoins the front face of the other cellular component part, wherein the facing component part comprises an outer facing sheet of a porous permeable powder sintered thermoplastics material.

16. An aero engine having a surface subjected to a passage across it of gaseous flow and a noise attenuation panel according to claim 15 so positioned that its front face forms the surface or part of the surface subjected to the passage of gaseous flow.

17. The panel according to claim 15, wherein the second cellular component part is an open-celled plastics foam.

* * * * *